(12) United States Patent
Goto et al.

(10) Patent No.: US 6,304,820 B1
(45) Date of Patent: Oct. 16, 2001

(54) DISPLAY APPARATUS AND NAVIGATION SYSTEM USING THE SAME

(75) Inventors: Yoshifumi Goto, Nishio; Shinichi Tsutsuki, Anjo, both of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/562,128

(22) Filed: May 1, 2000

(30) Foreign Application Priority Data

May 14, 1999 (JP) .................................................. 11-134100

(51) Int. Cl.[7] .................................................. G01C 21/34
(52) U.S. Cl. ........................ 701/209; 701/211; 701/201; 340/990; 340/995
(58) Field of Search .................................. 701/200, 201, 701/209, 211; 340/990, 995; 345/635, 636

(56) References Cited

U.S. PATENT DOCUMENTS 6,121,900 * 9/2000 Takishita .............................. 340/995
6,243,646 * 6/2001 Ozaki et al. ......................... 701/211

FOREIGN PATENT DOCUMENTS 2-302792 12/1990 (JP) .
05-316541 11/1993 (JP) .
10-340073 12/1998 (JP) .

* cited by examiner

Primary Examiner—William A. Cuchlinski, Jr.
Assistant Examiner—Marthe Y. Marc-Coleman
(74) Attorney, Agent, or Firm—Law Office of David G. Posz

(57) ABSTRACT

A display unit for a vehicular navigation system, which has a relatively small display unit that information displayed thereon can be clearly recognized from any position, when information such as texts or images are displayed on the relatively small display screen. The display unit is provided with a display screen for displaying HTML data made up of text data or image data, and a controller for vertically scrolling the text data or the image data in the display screen. The controller further sets display restriction areas at both peripheral sides of the display screen. Each of the display restriction areas corresponds to a width of two characters toward a center portion of the display screen from each peripheral end. As a result, the HTML data is not displayed at peripheral portions in the display screen at which it is hard to be recognized. As a result, user can clearly recognize all of the HTML data displayed on the display screen.

5 Claims, 3 Drawing Sheets

DISPLAY APPARATUS AND NAVIGATION SYSTEM USING THE SAME

CROSS REFERENCE TO RELATED APPLICATION

This application is based upon Japanese Patent Application No. Hei. 11-134100 filed on May 14, 1999, the contents of which are incorporated herein by reference.

BACKGROUND OF THE INVENTION

1. Field of the Invention

This invention relates to display apparatuses, and particular to a display unit for a navigation system and a navigation system using the same.

2. Related Art

Recently, a navigation system has been mounted on a vehicle. It is preferable for user of the navigation system to brows Internet information (e.g., information written in HTML (Hyper Text Markup Language) format) by using a display unit of the vehicular navigation system. It can be realized by integrating a program of a browser, which is software to brows (read) the HTML data, into the vehicular navigation system.

In a case where text data (character string data) of the Internet information is displayed on the display unit of the vehicular navigation system, as shown in FIG. 5, it might be thought to display the text data at entire area, on which the text data can be displayed, of a display screen A of the display unit. Furthermore, when an amount of the text data is larger than a predetermined value, which is a maximum amount of the text data be displayed at one time, it might be thought to display the text data by vertically scrolling the text data.

However, the display unit for the vehicular navigation system is small compared to a display unit for a personal computer or the like. Furthermore, a passenger sat on a front passenger seat has to see the display unit from a portion having a large visual angle with respect to a normal direction of the display surface. In such a case, it might be hard to see the text data at a peripheral portion of the display screen due to its viewing angle.

Here, when a map is displayed on the display screen, the map can be easily scrolled in lateral direction or in vertical direction. Therefore, even when it is hard to see the map at a peripheral portion of the screen, the map can be easily recognized by laterally scrolling the screen. On the contrary, when the text data of the Internet information is displayed on the display screen, since the screen can be vertically scrolled but cannot be laterally scrolled, it would be hard to see the text data at a peripheral portion of the display screen.

It would be thought to laterally scroll the text data, when the Internet information is displayed on the display screen. However, since each sentence of the text data continues from one peripheral portion to another peripheral portion when a line is changed, when the text data is laterally scrolled to one side, the text data at another side will be disappeared. Hence, it would be much harder to recognize the Internet information. Therefore, the laterally scrolling the text data would be not an adequate countermeasure to overcome the above-described inconvenience.

SUMMARY OF THE INVENTION

This invention has been conceived in view of the background thus far described and its object is to provide a display unit that information displayed thereon can be clearly recognized from any position, when information such as texts or images are displayed on a relatively small display screen.

According to the present invention, the display controller sets a display restriction area at at least one of peripheral portions in a lateral direction in the display screen, the display restriction area has a predetermined width toward a center potion of the display screen from a peripheral end of the display screen.

As a result, the general-purpose data is not displayed at peripheral portions in the display screen at which it is hard to be recognized. As a result, user can clearly recognize all of the general-purpose data displayed on the display screen.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

DESCRIPTION OF THE PREFERRED EMBODIMENTS

A preferred embodiment, in which the present invention is applied to a vehicular navigation system, will be explained hereinafter with reference to FIGS. 1 to 4.

Figure 2:
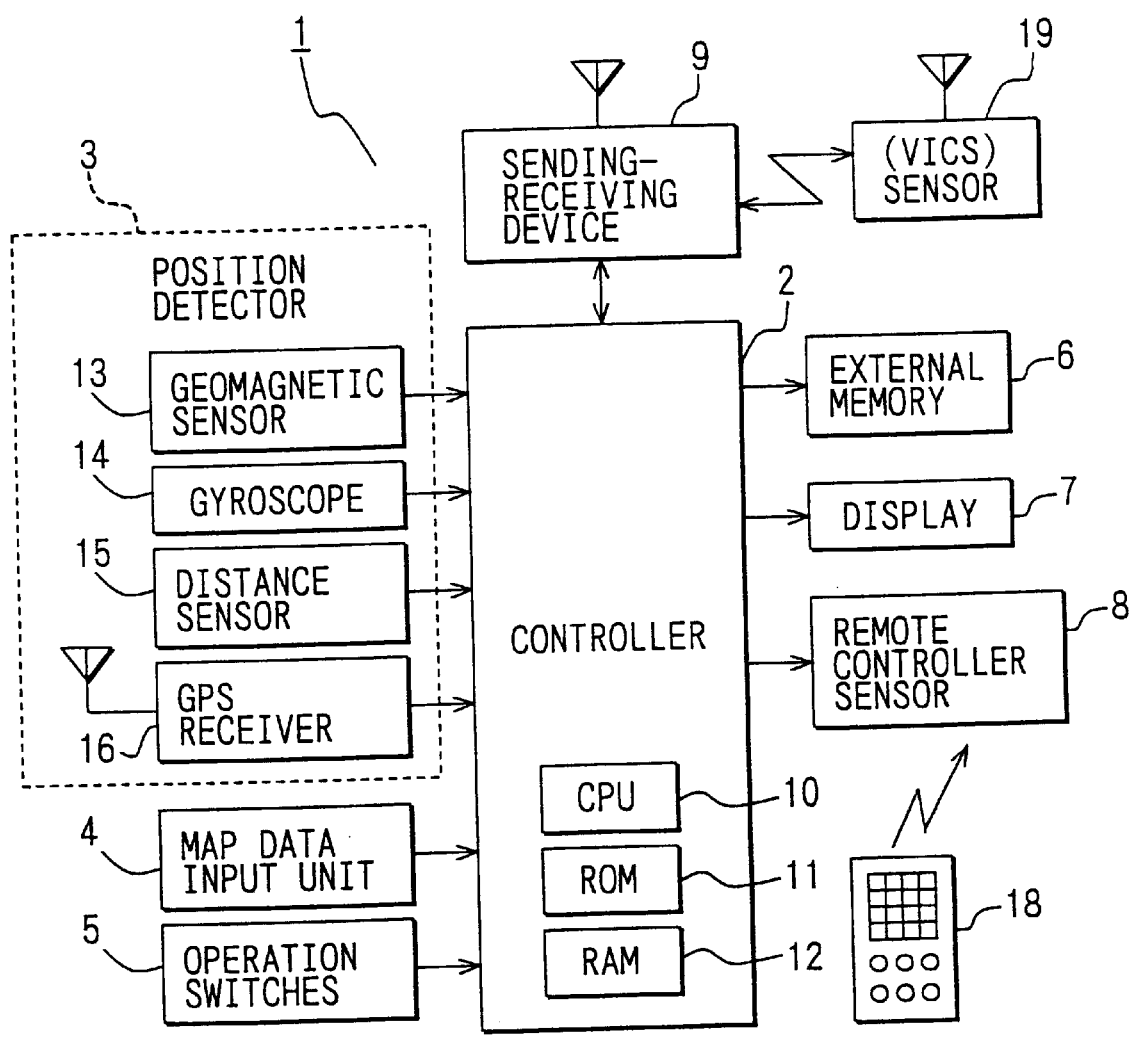
FIG. 2 is a schematic block diagram illustrating a vehicular navigation system.

As shown in FIG. 2, the vehicular navigation system 1 is provided with a controller 2 (display controlling means), a position detector 3, a map data input unit 4, operation switches 5, an external memory 6, a display unit 7 (displaying means), a remote controller sensor 8, and a sending-receiving device 9.

The controller 2 controls entire operations of the vehicular navigation system 1, and is constructed by a computer (e.g.,microcomputer). In detail,the controller 2 is provided with a CPU (Central Processing Unit) 10, a ROM 11, a RAM 12, not-shown I/O (input-output) terminals, and a not-shown bus for connecting the above components.

The position detector 3 is provided with a geomagnetic sensor 13, a gyroscope 14, a distance sensor 15, and a GPS (Global Positioning System) 16. The position detector 3 is constructed so that these four sensors 13–16 are used by interpolating with each other so as to improve an accuracy of the position detection. Here, the position detector 3 may employ only one of the above-described sensors or more when the accuracy of the position detection is satisfied. On the contrary, a steering angle sensor or wheel sensors for each wheel may be used in addition to the above-described sensors 13–16.

The map data input unit 4 is made up of a read out unit for reading out a storing medium such as a DVD-ROM, and is for in putting several data including map data, map-matching data, landmark data, or the HTML data (Internet information). In this case, the DVD-ROM as the storing medium stores data including the map data and the HTML data. Here, a CD-ROM or a memory card can be used as the storing medium instead of the DVD-ROM. Here, the HTML data (Internet information) corresponds to general-purpose data, which can be generally used for several data processing devices.

The display unit 7 is made up of a color liquid crystal display or the like, and is provided with a display screen 17 (see FIGS. 1 and 3) capable of clearly displaying the map, the text, and the image. A present position mark, the map data, and additional data such as route guidance can be displayed on the display screen 17 of the display unit 7, by being superimposed therebetween.

The operation switches 5 include a touch sensor (touch panel) provided on a surface of the display screen 17, and mechanical push switches provided at peripheral portions of the display screen 17. The remote controller sensor 8 is a receiver for receiving a sending signal, which is sent from a remote controller 18 as a result of user's operation. The sending-receiving device 9 sends or receives infrastructure data or the like, and receives VICS (Vehicle Information & Communication System) data via a VICS sensor 19. Furthermore, in this embodiment, the sending-receiving device 9 is capable of receiving the HTML data (Internet information) and transferring it to the vehicular navigation system 1 (specifically, the controller 2).

The controller 2 of the vehicular navigation system 1 has mainly two functions including a navigation function and a browsing function. In detail, when a user sets a destination with operating the operation switches 5 or the remote controller 18, the controller 2 of the vehicular navigation system 1 automatically determines an adequate route (guidance route) from the present position to the destination (navigation function). The controller 2 displays the present position on the map by a map-matching process (navigation function). Furthermore, the controller 2 browses the HTML data (Internet information) (browser function). Here, the Dijkstra's algorithm is known for automatically determining the adequate route.

When controller 2 browses the HTML data, controller 2 displays the HTML data on the display screen 17. In this case, the controller 2 provides display restriction areas, each of which has a predetermined margin at which no texts or images are displayed, at both (right and left) peripheral portions of display screen 17. A display control will be explained with reference to FIGS. 1, 3 and 4.

Figure 4:
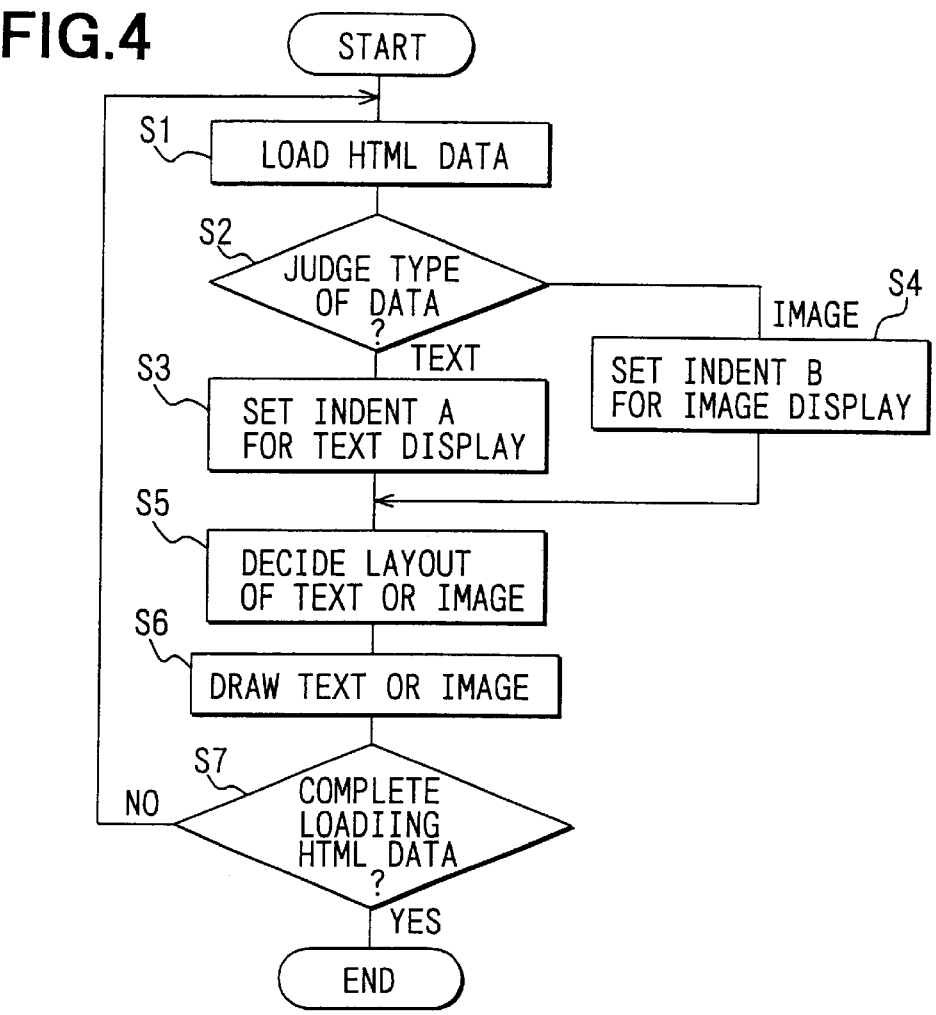
FIG. 4 is a flowchart illustrating a data display process.
Figure 5:
FIG. 5 is a diagram illustrating a display screen, on which text data of HTML data is displayed, according to a related art.

When one of the operation switches for calling the browser function is operated while the navigation function is operated (e.g., while a menu or the map is displayed on the display screen), the controller 2 starts up the browser function. After the browser function starts up, as shown in FIG. 4, the controller 2 starts up a process for reading out the HTML data at step S1. In detail, at step S1, the controller 2 loads the HTML data (Internet information) stored in the DVD-ROM via the map data input unit 4. Here, the HTML data may be loaded onto the RAM 12 via the sending-receiving device 9.

Figure 1:
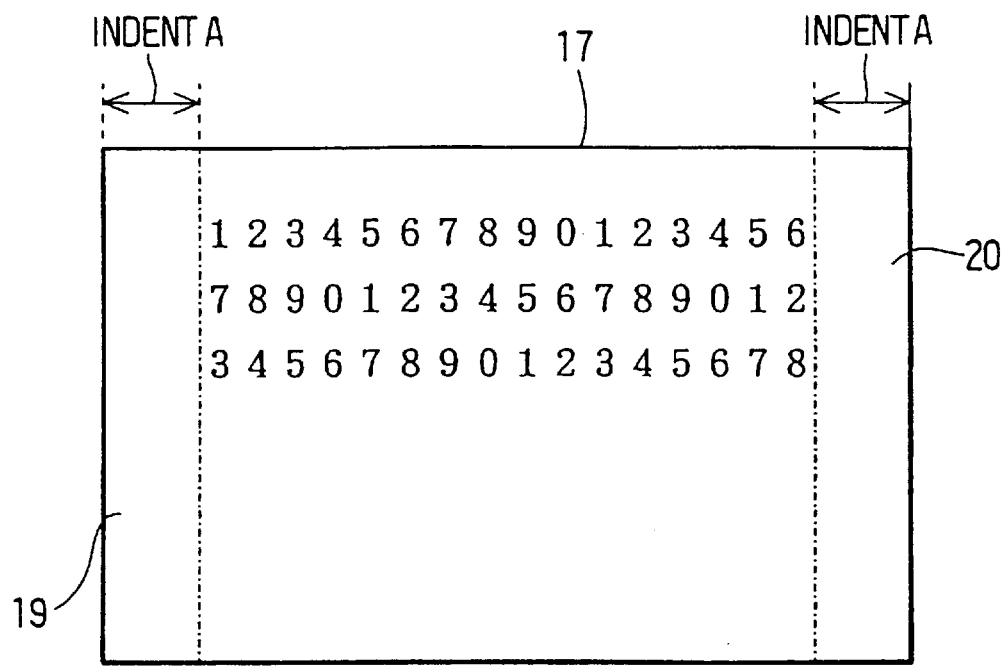
FIG. 1 is a diagram illustrating a display screen, on which text data of HTML data is displayed, of a first embodiment according to the present invention.

Next, the controller 2 detects type of the loaded HTML data at step S2. In detail, the controller 2 judges whether the type of the loaded HTML data is the text data or the image data. When the type of the data is the text data, the controller 2 moves to step S3 to set an indent A for displaying the text data. As shown in FIG. 1, the indent A for displaying the text data sets the display restriction areas 19 and 20 at both peripheral sides of the display screen 17. Each of the display restriction areas 19 and 20 corresponds to a width (a dimension in lateral direction) of, for example, two characters from each peripheral end toward a center portion of the display screen 17.

Figure 3:
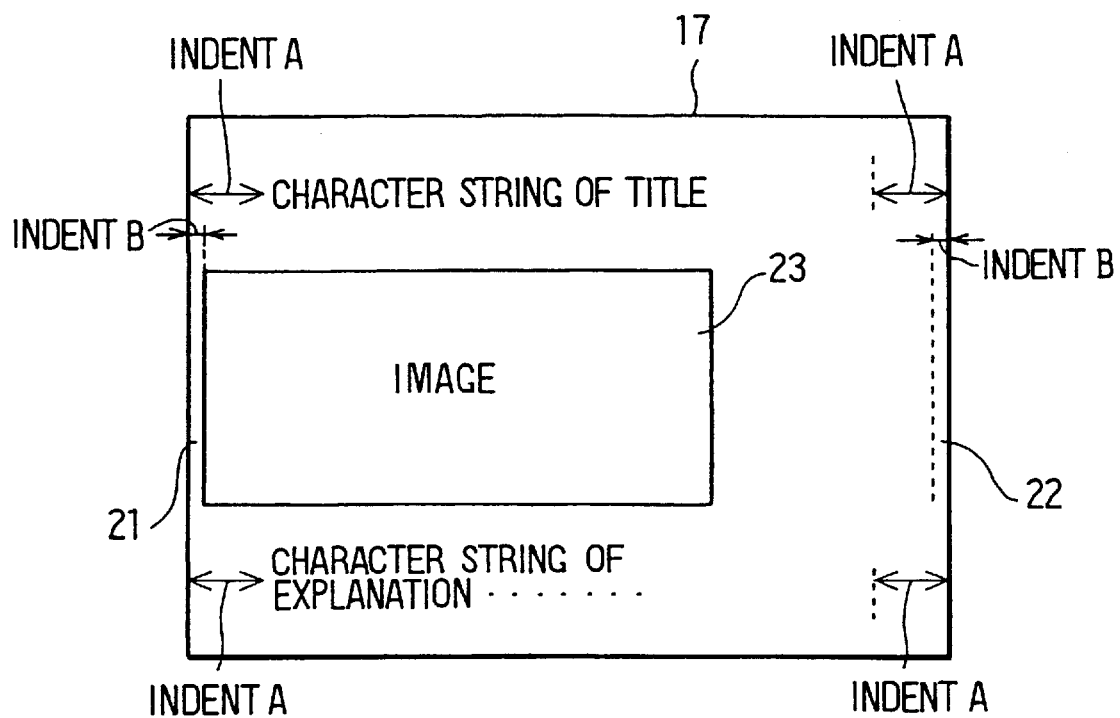
FIG. 3 is a diagram illustrating the display screen, on which image data of HTML data is displayed.

At step S2, when the type of the data is the image data, the controller 2 moves to step S4 to set an indent B for displaying the image data. As shown in FIG. 3, the indent B for displaying the image data sets the display restriction areas 21 and 22 at both peripheral sides of the display screen 17. Each of the display restriction areas 21 and 22 corresponds to a width of, for example, a half character toward a center portion of the display screen 17 from each peripheral end. In FIG. 3, since a width (lateral direction) of the image 23 is shorter, the width of a non-display area at right side of the image 23 becomes longer than the width of the indent B. Furthermore, since the character string of the title of the image and the character string of the explanation of the image are the text data (character string data), the indent A is set at both of the peripheral portions in the display screen 17.

At step S5, the controller 2 decides a layout of the text data and the image data on the display screen 17. At the following step S6, the controller 2 displays the text data and the image data on the display screen 17. Here, when the HTML data is the text data, the controller 2 displays the text data so that a new line of the text data starts from the display restriction area 19 at the left side and turns at the display restriction area 20 at the right side. When the amount of the text data to be displayed is larger than the predetermined value, which is the maximum amount of the text data to be displayed at one time in one frame, the controller 2 allows the text data to be vertically scrolled in the display screen 17.

On the contrary, when the HTML data is the image data, the image 23 is displayed so that the image 23 does not overlap with the display restriction area 21 at the left side. Here, when the image 23 has a wide width enough to overlap with the display restriction area 22 at the right side, the controller 2 reduces the width of the image 23, so that the image 23 does not overlap with the display restriction area 22 at the right side.

In this case, an entire size (both height and width) of the image 23 may be reduced so that the image 23 does not overlap with the display restriction areas 21 and 22. Furthermore, a data size of the image data of the HTML data to be loaded may be restricted. In detail, the width of the image data may be restricted to a predetermined width, which is decided by subtracting each size of the display restriction areas 21 and 22 from a width of the display screen 17. Here, in FIG. 3, since the character strings of the title and the explanation, which are attached to the image 23, are text data, these character strings are displayed so that the indent A is set at both of the peripheral portions in the display screen 17.

A height (a dimension in vertical direction) of the image data is preferable to be restricted to a predetermined height, which is a maximum height of the image data to be displayed at one time in one frame. Here, when the height of the image data is larger than a predetermined height, which is a maximum height of the image data to be displayed at one time in one frame, the image data may be vertically scrolled in the display screen 17.

Next, at step S7, the controller 2 judges whether the controller 2 has completed loading the HTML data. When the loading of the HTML data has completed, the controller 2 determined as "YES" at step S7, and ends the process. On the contrary, when the loading of the HTML data has not completed, the controller 2 determined as "NO" at step S7, and returns to step S1 to repeat the loading of the HTML data. After that, the controller 2 repeats steps S2–S7.

According to this embodiment, since the display restriction areas 19, 20, 21 and 22 are set at both peripheral portions (leftside and right side) of the display screen 17 toward the center portion thereof, the HTML data (general-purpose data) is not displayed at the peripheral portions area the display screen 17 at which it is hard to be recognized. As a result, the user can clearly recognize all of the HTML data displayed on the display screen 17.

Here, in the above embodiment, the display restriction areas 19, 20, 21 and 22 are set at both peripheral portions (left side and right side) of the display screen 17, however, one of the display restriction areas 19, 20, 21 and 22 may be set at only one peripheral portion (left side or right side), at which the user feels hard to recognize, of the display screen 17.

In the above embodiment, the width of each of the display restriction areas 19, 20, 21 and 22 is fixed, however, the width may be changed. In this case, it is preferable to prepare a menu for inputting each width of the display restriction areas 19, 20, 21 and 22, and for setting the width in a unit of character or a unit of dot. According to this modification, since the user can adjust each display restriction area to user's favorite dimension, it becomes more useful for the user.

In the above embodiment, the width of each of the display restriction areas 19, 20, 21 and 22, that is the indent A or B, is automatically applied to the peripheral portions, however, the width may be selectively set from one of the indent A and the indent B. In this case, it is preferable to provide a menu for selecting one of the indents A and B, a menu for turning on or off the indent A, and a menu for turning on or off the indent B. According to this modification, when the user does not desire to apply the display restriction areas 19, 20, 21 and 22 because he/she wants to display the HTML data on the display screen 17 with full screen, the controller 2 can display the HTML data based on the user's desire.

Furthermore, each of the display restriction areas can be respectively selected from one of the indent A and indent B. As a result, the controller 2 can display the HTML data based on the user's desire.

Here, in this embodiment, the present invention is exemplified by using the vehicular navigation system 1, however, the present invention can be applied to a portable navigation system or a navigation system assembled in a watch, each of which having a small display unit.

What is claimed is:

1. A vehicular navigation system comprising:

a position detector for detecting a present position of a vehicle;

a data input unit for inputting general-purpose data including text data and image data;

a display controller connected to the position detector and the data input unit, for calculating a guidance route based of the present position, and for setting a layout of the general-purpose data;

a display unit connected to the display controller, having a display screen for displaying the guidance route and the general-purpose data;

wherein the display controller sets a first display restriction area at at least one of peripheral portions in a lateral direction in the display screen when the display controller displays the text data of the general-purpose data, and sets a second display restriction area at at least one of peripheral portions in the lateral direction in the display screen when the display controller displays the image data of the general-purpose data, the first display restriction area has a first predetermined width toward a center portion of the display screen from a peripheral end of the display screen, and the second display restriction area has a second predetermined width toward a center portion of the display screen from the peripheral end of the display screen.

2. A vehicular navigation system according to claim 1, wherein the first predetermined width is different from the second predetermined width.

3. A vehicular navigation system according to claim 1, wherein the first predetermined width is larger than the second predetermined width.

4. A vehicular navigation system according to claim 1, wherein the display controller reduces at least width of the image data when a width of the image data is larger than a third predetermined width, and displays the reduced image data on the display screen.

5. A vehicular navigation system according to claim 4, wherein the third predetermined width corresponds to a width of the display screen except of the display restriction area.

* * * * *